US012596543B2

(12) United States Patent
Lea

(10) Patent No.: US 12,596,543 B2
(45) Date of Patent: Apr. 7, 2026

(54) OVER-THE-AIR SERVICE PLATFORM SUPPORT FOR TR-069 MULTIPLE FIRMWARE IMAGES AND SERVERLESS ENVIRONMENTS

(71) Applicant: Rakuten Mobile, Inc., Tokyo (JP)

(72) Inventor: Richard Lea, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 175 days.

(21) Appl. No.: 18/041,999

(22) PCT Filed: Nov. 29, 2022

(86) PCT No.: PCT/US2022/051281
§ 371 (c)(1),
(2) Date: Feb. 17, 2023

(87) PCT Pub. No.: WO2024/118060
PCT Pub. Date: Jun. 6, 2024

(65) Prior Publication Data
US 2024/0281236 A1 Aug. 22, 2024

(51) Int. Cl.
| | |
|---|---|
| *G06F 9/445* | (2018.01) |
| *G06F 8/65* | (2018.01) |
| *H04W 12/40* | (2021.01) |
| *H04W 76/11* | (2018.01) |

(52) U.S. Cl.
CPC .............. *G06F 8/65* (2013.01); *H04W 12/40* (2021.01); *H04W 76/11* (2018.02)

(58) Field of Classification Search
CPC ... G06F 8/71; G06F 8/60; G06F 9/547; G06F 8/61; G06F 16/23
USPC .................................................. 717/168–178
See application file for complete search history.

(56) References Cited

U.S. PATENT DOCUMENTS

| | | | | |
|---|---|---|---|---|
| 8,327,391 | B2 * | 12/2012 | Wang | H04L 67/125 |
| | | | | 719/330 |
| 2010/0062808 | A1 * | 3/2010 | Cha | G06Q 20/308 |
| | | | | 726/22 |
| 2015/0178061 | A1 * | 6/2015 | Wang | G06F 8/61 |
| | | | | 717/172 |
| 2016/0234686 | A1 * | 8/2016 | Bone | G06F 13/1689 |

* cited by examiner

*Primary Examiner* — Chuck O Kendall
(74) *Attorney, Agent, or Firm* — HAUPTMAN HAM, LLP

(57) ABSTRACT

A firmware over-the-air (FOTA) update is provided to a client device. An interoperable firmware over-the-air (FOTA) interface configured to use TR-069 protocol is provisioned. A firmware update session with a client device is established at a server using the interoperable FOTA interface. Data model parameters of the client device using the TR-069 protocol are received at the server. A firmware image is provisioned by the server to the client device based on the data model parameters using the TR-069 protocol.

17 Claims, 16 Drawing Sheets

100

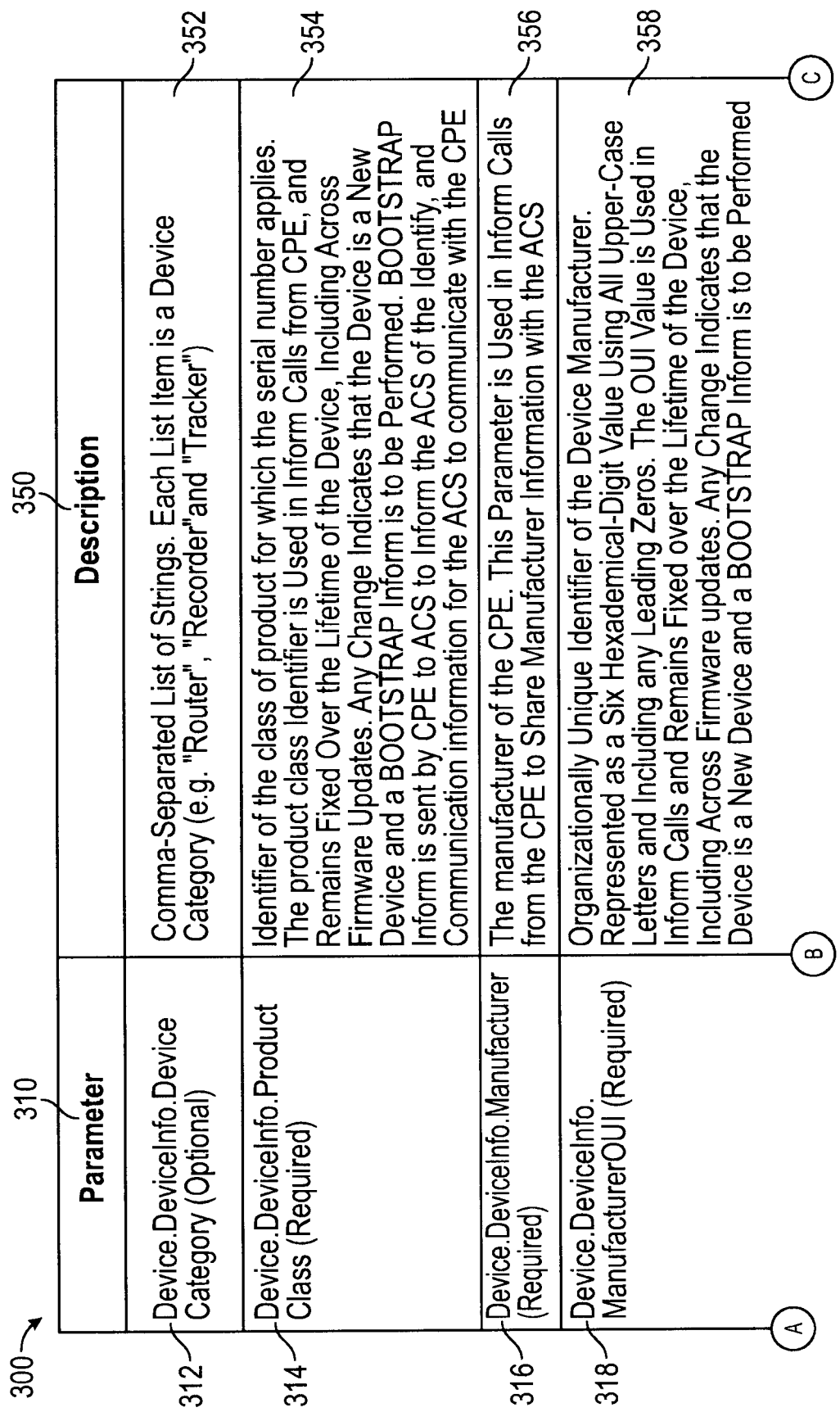

| Parameter | Description |
|---|---|
| Device.DeviceInfo.Device Category (Optional) | Comma-Separated List of Strings. Each List Item is a Device Category (e.g. "Router", "Recorder" and "Tracker") |
| Device.DeviceInfo.Product Class (Required) | Identifier of the class of product for which the serial number applies. The product class Identifier is Used in Inform Calls from CPE, and Remains Fixed Over the Lifetime of the Device, Including Across Firmware Updates. Any Change Indicates that the Device is a New Device and a BOOTSTRAP Inform is to be Performed. BOOTSTRAP Inform is sent by CPE to ACS to Inform the ACS of the Identify, and Communication information for the ACS to communicate with the CPE |
| Device.DeviceInfo.Manufacturer (Required) | The manufacturer of the CPE. This Parameter is Used in Inform Calls from the CPE to Share Manufacturer Information with the ACS |
| Device.DeviceInfo. ManufacturerOUI (Required) | Organizationally Unique Identifier of the Device Manufacturer. Represented as a Six Hexademical-Digit Value Using All Upper-Case Letters and Including any Leading Zeros. The OUI Value is Used in Inform Calls and Remains Fixed over the Lifetime of the Device, Including Across Firmware updates. Any Change Indicates that the Device is a New Device and a BOOTSTRAP Inform is to be Performed |

300

310 Parameter

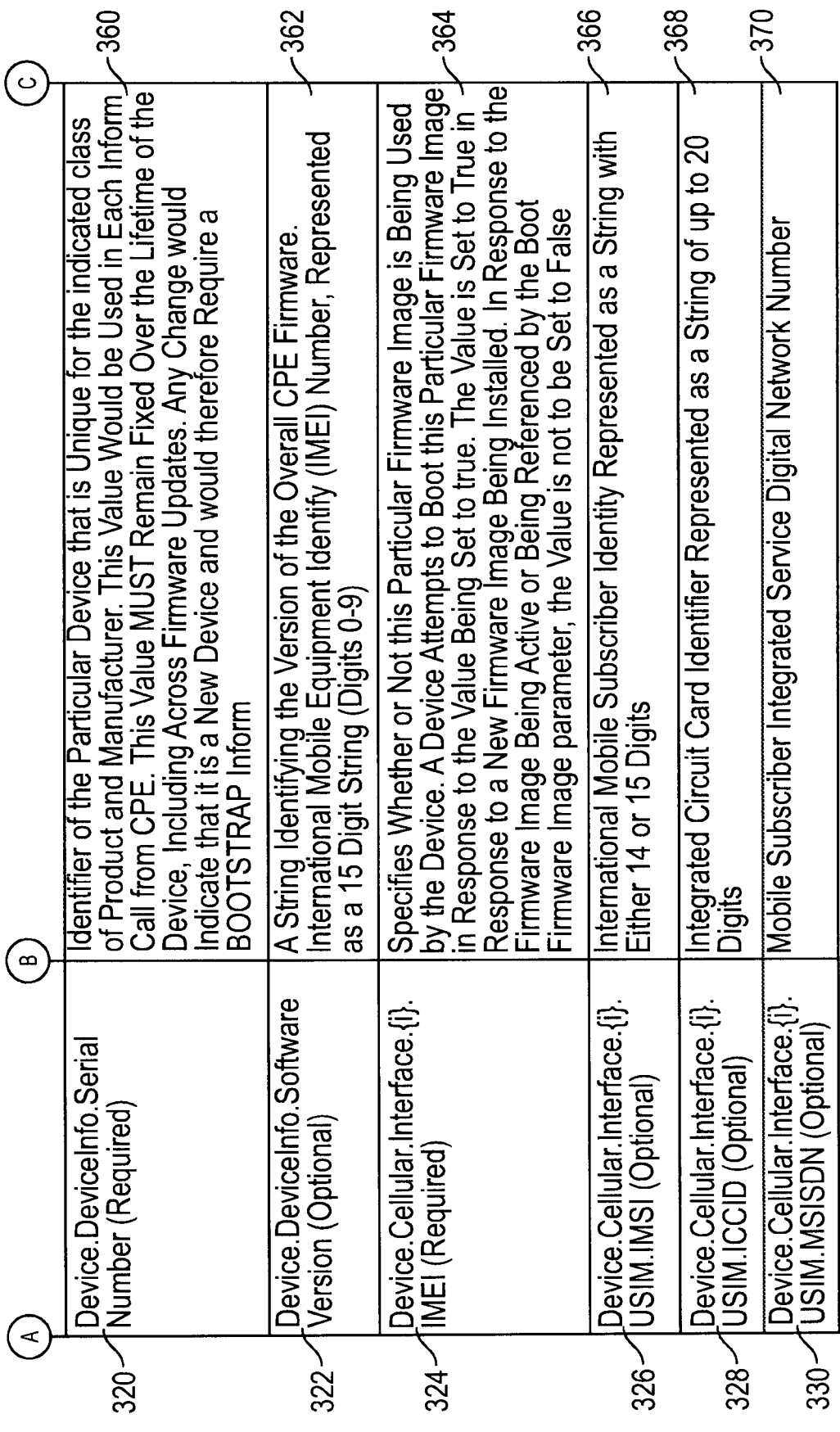

| A | B | C |
|---|---|---|
| 320 — Device.DeviceInfo.Serial Number (Required) | Identifier of the Particular Device that is Unique for the indicated class of Product and Manufacturer. This Value Would be Used in Each Inform Call from CPE. This Value MUST Remain Fixed Over the Lifetime of the Device, Including Across Firmware Updates. Any Change would Indicate that it is a New Device and would therefore Require a BOOTSTRAP Inform | 360 |
| 322 — Device.DeviceInfo.Software Version (Optional) | A String Identifying the Version of the Overall CPE Firmware. International Mobile Equipment Identify (IMEI) Number, Represented as a 15 Digit String (Digits 0-9) | 362 |
| 324 — Device.Cellular.Interface.{i}. IMEI (Required) | Specifies Whether or Not this Particular Firmware Image is Being Used by the Device. A Device Attempts to Boot this Particular Firmware Image in Response to the Value Being Set to true. The Value is Set to True in Response to a New Firmware Image Being Installed. In Response to the Firmware Image Being Active or Being Referenced by the Boot Firmware Image parameter, the Value is not to be Set to False | 364 |
| 326 — Device.Cellular.Interface.{i}. USIM.IMSI (Optional) | International Mobile Subscriber Identity Represented as a String with Either 14 or 15 Digits | 366 |
| 328 — Device.Cellular.Interface.{i}. USIM.ICCID (Optional) | Integrated Circuit Card Identifier Represented as a String of up to 20 Digits | 368 |
| 330 — Device.Cellular.Interface.{i}. USIM.MSISDN (Optional) | Mobile Subscriber Integrated Service Digital Network Number | 370 |

FIG. 3A
(Continued)

| Parameter (Continued) | Description (Continued) |
|---|---|
| Device.DeviceInfo.FirmwareImage. {i}.Alias (Optional) *← 332* | A Non-Volatile Unique Key Used to Reference this Instance of the Firmware Image. Alias Provides a Mechanism for a Controller to Label this Instance for Future Reference. The Value MUST NOT be Empty and the Value Must Start with a Letter. In Response to the Value of Alias Not Being Assigned by the Controller at Creation Time, an Agent Assigns a Value with an "CPE-" Prefix. The Value of Alias Does Not Change Once the Value has been Assigned *← 372* |
| Device.DeviceInfo.FirmwareImage. {i}.Name (Optional) *← 334* | Firmware Image Name. This Value Should be Descriptive Text of the Image or Filename *← 374* |
| Device.DeviceInfo.FirmwareImage. {i}.Version (Required) *← 336* | A String Identifying the Version of the Firmware Image. In Response to the Firmware image Version Being Active (i.e., the Device has Booted this Firmware Image), the Value of the DeviceInfo.Software Version Parameter is to be Same as the Value Contained in this Parameter *← 376* |
| Device.DeviceInfo.FirmwareImage. {i}.Available (Required) *← 338* | Specifies Whether or Not this Particular Firmware Image is Being Used by the device. A device attempts to boot this particular Firmware image in response to the value being set to true. The Value is set to true in response to a new firmware image Being Installed. in Response to the Firmware Image being active or Being Referenced by the Boot Firmware Image Parameter, the Value is Not to be Set to False *← 378* |

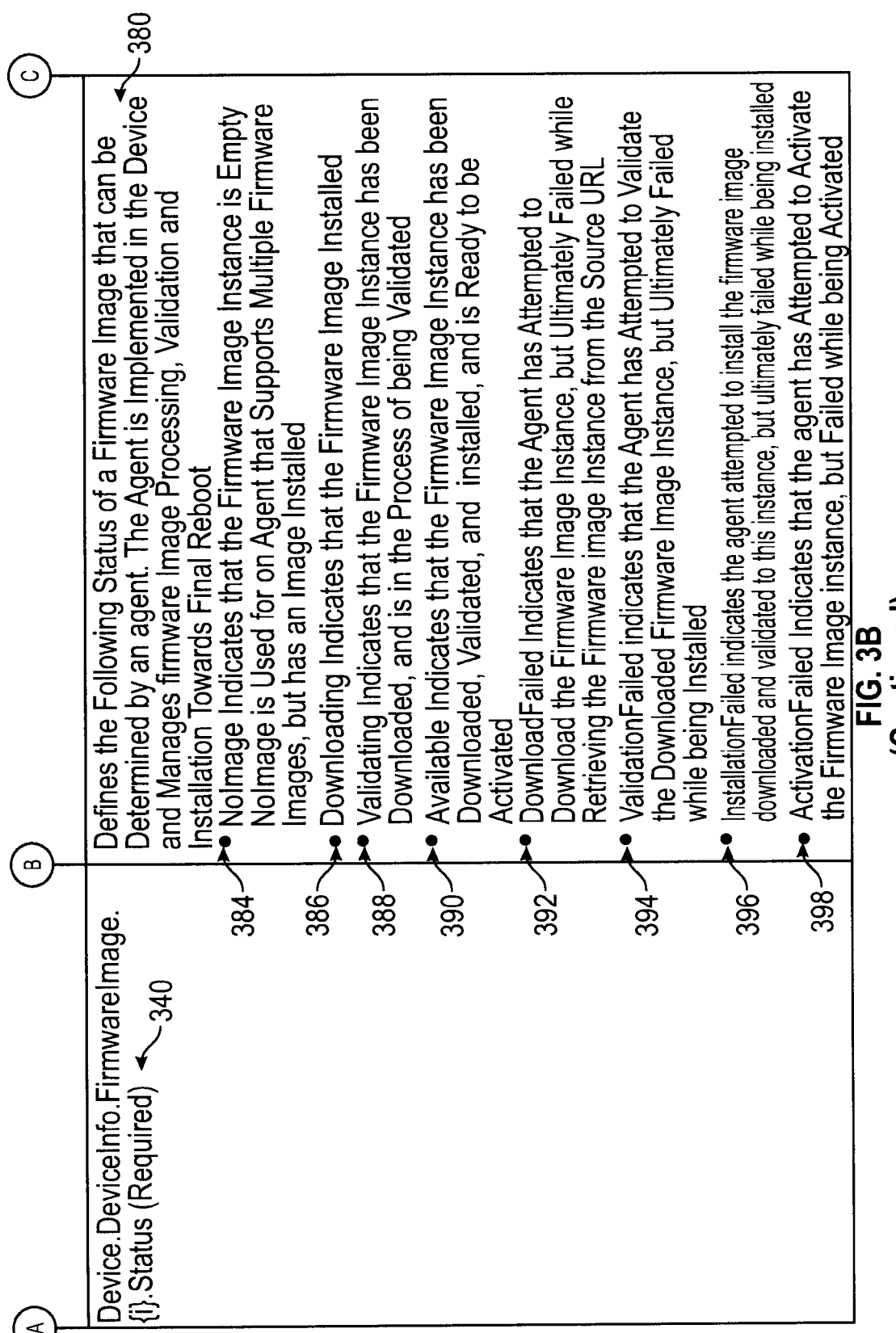

Device.DeviceInfo.FirmwareImage.
{i}.Status (Required) ← 340

Defines the Following Status of a Firmware Image that can be Determined by an agent. The Agent is Implemented in the Device and Manages firmware Image Processing, Validation and Installation Towards Final Reboot — 380

384 — ● NoImage Indicates that the Firmware Image Instance is Empty NoImage is Used for on Agent that Supports Multiple Firmware Images, but has an Image Installed 386 — ● Downloading Indicates that the Firmware Image Installed 388 — ● Validating Indicates that the Firmware Image Instance has been Downloaded, and is in the Process of being Validated 390 — ● Available Indicates that the Firmware Image Instance has been Downloaded, Validated, and installed, and is Ready to be Activated 392 — ● DownloadFailed Indicates that the Agent has Attempted to Download the Firmware Image Instance, but Ultimately Failed while Retrieving the Firmware image Instance from the Source URL 394 — ● ValidationFailed indicates that the Agent has Attempted to Validate the Downloaded Firmware Image Instance, but Ultimately Failed while being Installed 396 — ● InstallationFailed indicates the agent attempted to install the firmware image downloaded and validated to this instance, but ultimately failed while being installed 398 — ● ActivationFailed Indicates that the agent has Attempted to Activate the Firmware Image instance, but Failed while being Activated

1210 — I/O Interface

1202 — Processor

1212 — Network Interface

1214 — Network

1204 — Non-Transistory, Computer- Readable Storage medium

1206 — Instructions

OVER-THE-AIR SERVICE PLATFORM SUPPORT FOR TR-069 MULTIPLE FIRMWARE IMAGES AND SERVERLESS ENVIRONMENTS

RELATED APPLICATIONS

The present application is a National Phase of International Application No. PCT/US2022/051281, filed Nov. 29, 2022.

TECHNICAL FIELD

This description relates to Over-The-Air (OTA) Service Platform support for TR-069 multiple firmware images and serverless environments.

BACKGROUND

Device re-programming, such as upgrading firmware, has traditionally been performed manually. A consumer was responsible for updating mobile device firmware via a device-specific service facility or a computer download. These inconvenient methods often resulted in inconsistent firmware upgrades and other issues. For operators, manual re-programming of devices is time-consuming and cost-ineffective, and in some instances is cost-prohibitive or impossible. This resulted in the passage of months or years with upgrades being made to devices, and caused such devices to become obsolete and more vulnerable to malicious actors.

Firmware Over-The-Air (FOTA) is a Mobile Software Management (MSM) technology in which the operating firmware of a mobile device is wirelessly upgraded and updated by the manufacturer and/or carrier, without the need of physical access to a device. FOTA-capable phones download upgrades directly from the service provider. The ability to refresh the operating system of mobile devices keeps mobile devices secure, to add new functionalities, and to address errors, flaws, or faults in mobile device software.

Numerous protocols support FOTA, including provisioning, performing diagnostics, upgrading firmware, and removing, installing, and activating software components. For example, Open Mobile Alliance (OMA) Device Management (DM) is a protocol for management of mobile devices. OMA DM includes a number of specifications including protocol, architecture, underlying network binding etc. In the most common scenario, by implementing OMA DM specifications, the DM Server is able to handle remote management of mobile devices that have a DM Client. At the application layer, OMA DM implements the Firmware Update Management Object (FUMO) and the DM Client. The DM Server performs remote management on devices including the above-mentioned provisioning, performing diagnostics, upgrading firmware, and removing, installing, and activating software components. However, OMA DM is designed for use with mobile phones or devices similar to mobile phones.

The CPE WAN (CWMP) Management Protocol, published by The Broadband Forum as TR-069, specifies a standard for a communication mechanism for the remote management of end-user devices. The standard defines a protocol for the secure automated configuration of a TR-069-capable device and incorporates other management functions into a common framework. The TR-069 protocol simplifies device management by specifying the use of an Auto Configuration Server (ACS) to perform remote, centralized management of customer premises equipment (CPE). However, TR-069 does not provide an application layer for managing Over-The-Air (OTA) firmware upgrades of mobile devices using the OMA DM protocol.

Previously, end device manufactures (e.g., smartphone) manage and control firmware upgrades themselves. Therefore, a device manufacturer is able to maintain firmware on their own servers. Device manufactures also design their own data-package used for firmware upgrades. Presently, there is not a platform that is capable of implementing firmware upgrades for varied types of devices, including, but not limited to, mobile phones. Further, TR-069 native devices are enabled with FOTA service, where historically FOTA services are restricted within OMA-DM devices or vendor-specified devices. With TR-069, vendors are able to fully manage firmware updates. However, there is no support for FOTA that allows participation by the consumer (user of a device).

SUMMARY

In at least embodiment, a method for providing a firmware over-the-air (FOTA) update to client devices includes provisioning an interoperable firmware over-the-air (FOTA) interface configured to use TR-069 protocol, establishing, at a server using the interoperable FOTA interface, a firmware update session with a client device, receiving, at the server, data model parameters of the client device using the TR-069 protocol, and provisioning, by the server using the TR-069 protocol, a firmware image to the client device based on the data model parameters.

In at least embodiment, a platform for providing firmware over-the-air (FOTA) services to client devices includes a memory storing computer-readable instructions, and a processor configured to execute the computer-readable instructions to provision an interoperable firmware over-the-air (FOTA) interface configured to use TR-069 protocol, establish, using the interoperable FOTA interface, a firmware update session with a client device, receive data model parameters of the client device using the TR-069 protocol, and provision, using the TR-069 protocol, a firmware image to the client device based on the data model parameters.

In at least embodiment, a non-transitory computer-readable media having computer-readable instructions stored thereon, which when executed by a processor causes the processor to perform operations including provisioning an interoperable firmware over-the-air (FOTA) interface configured to use TR-069 protocol, establishing, at a server using the interoperable FOTA interface, a firmware update session with a client device, receiving, at the server, data model parameters of the client device using the TR-069 protocol, and provisioning, by the server using the TR-069 protocol, a firmware image to the client device based on the data model parameters.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIGS. 3A-B show a data model according to at least one embodiment.

DETAILED DESCRIPTION

Figure 1:
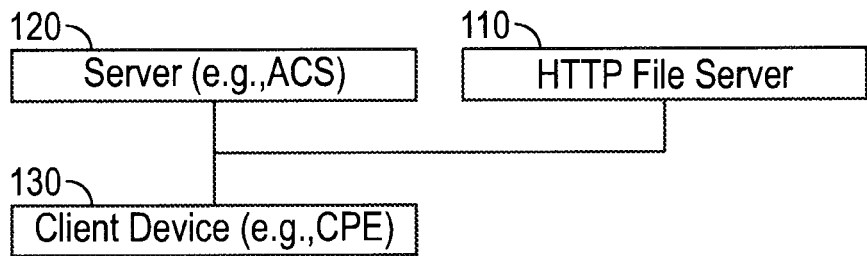
FIG. 1 illustrates a system for providing Firmware Over-the-Air (FOTA) services according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and "at least one of A, B, or C" includes A, B, C, A and B, A and C, B and C, or A and B and C.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming data-stream or signaling-stream. from UE.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

At least one embodiment provides a firmware update service that provides a common depository for firmware from different manufactures and system operators and that allows users and firmware providers to download firmware to upgrade mobile devices of users. In at least one embodiment, a firmware over-the-air (FOTA) service/platform is provided for a variety of end devices and uses the TR-069 protocol to enable firmware upgrades. The TR-069 protocol was not originally intended for end devices to perform under LTE network (basically 4G and 5G). The platform enables end devices to receive firmware upgrades under a WIFI environment and an LTE network. To provide this service with TR-069 gives rise to a first and major problem that the basic application layer is missing. According to an embodiment, an application layer is provided using a TR-069 firmware update protocol. The TR-069 Firmware Update Protocol uses a FOTA interface that supports FOTA upgrades.

Advantages include simplifying FOTA server development. Because no external parameters are added nor specified, TR-069 server components are reused. The FOTA feature on devices from different vendors is able to be cross-tested/used/deployed with different FOTA services that use the same TR-069 standard.

FIG. 1 illustrates a system 100 for providing Firmware Over-the-Air (FOTA) services according to at least one embodiment.

In FIG. 1, firmware updates are released and stored in an HTTP file server 110. An Auto Configuration Server (ACS) 120 resides in the network and manages devices in or at the subscriber premises. ACS 120 is responsible for auto-configuration of the CPE for advanced services. Customer Premises Equipment (CPE) 130 is a TR-069-enabled device, such as Mobile Phones Residential Gateways, Lan-side End Devices, and other Network Infrastructure Devices. TR-069 specifies the communication between CPE and ACS 120. The ACS acts as a remote management server for TR-069 enabled CPE 130. ACS 120 enables automated remote provisioning and management tasks for TR-069 CPE devices, such as provisioning firmware upgrades obtained by ACS 120 from HTTP file server 110. ACS 120 provisions a firmware upgrade to CPE 130.

Figure 2:
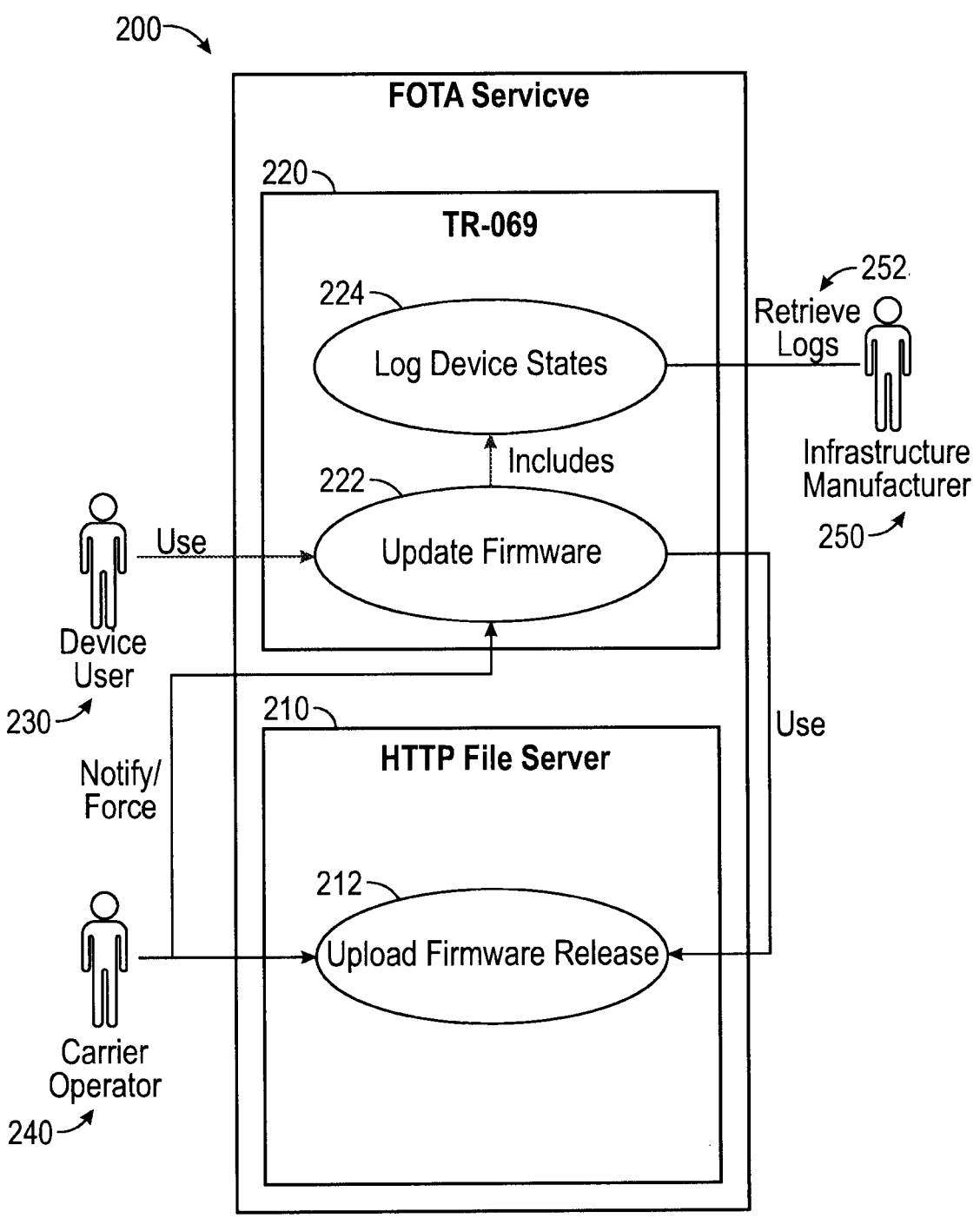
FIG. 2 illustrates a FOTA services platform according to at least one embodiment.

FIG. 2 illustrates a FOTA services platform 200 according to at least one embodiment.

The FOTA services platform 200 is able to be used under real business scenarios by manufacturers, operators and users. In FIG. 2, FOTA Services platform 200 includes an HTTP File Server 210 and TR-069 FOTA Interface 220. TR-069 FOTA Interface 220 is accessed by a Device User 230 to initiate Update Firmware 222 or by Carrier Operator 240 to notify the device of Device User 230 to initiate Update Firmware 222 or to force the device of Device User 230 to Update Firmware 222. The Carrier Operator 240 is able to provide an Upload Firmware Release 212 to HTTP File Server 210. Infrastructure Manufacturers 250 are able to retrieve logs 252 from Log Device States 224.

The FOTA services platform 200 provides an interoperable firmware update solution for mobile devices. In at least one embodiment, FOTA services platform 200 provides an interface between client and server to support this firmware update. The FOTA services platform 200 supports the download of update package(s), the subsequent installation of the update package(s) to update firmware, and the reporting of success or error results and associated status information. Carrier operators, service providers, infrastructure manufactures, device manufacturers (device vendors), and software vendors (mostly same with device manufacturers) use the FOTA services platform 200 to develop and deploy interoperable firmware update solutions.

In FIG. 2, the FOTA services platform 200 uses a data model designed for providing FOTA services based on TR-069 parameters. Device manufacturers provide the details of the specified parameters used by the data model for providing FOTA services as described in detail with reference to FIGS. 3A-B. For example, parameters used by the FOTA services platform 200 includes parameters associated with device information, device cellular interface, and device information regarding a firmware image.

Datatime provides the date and time of the given record line. International Mobile Equipment Identity (IMEI) number is represented as a 15 digit string (digits 0-9). Product-Class is the identifier of the class of product for which the serial number applies, as defined in TR-181. This value is used in an Inform call from CPE, as defined in TR-069 DeviceIdStruct. The value of ProductClass remains fixed over the lifetime of the device, including across firmware updates. Any change indicates that it is a new device and a BOOTSTRAP Inform is to be performed.

SerialNumber is the identifier of the particular device that is unique for the indicated class of product and manufacturer. The value of SerialNumber is used in an Inform call from CPE. The value of SerialNumber remains fixed over the lifetime of the device, including across firmware updates. Any change indicate that the device is a new device and a BOOTSTRAP Inform is to be performed.

Organizationally Unique Identifier (OUI) of the device manufacturer is represented as a six hexadecimal-digit value using upper-case letters and including any leading zeros. As defined in TR-069, the OUI value is used in an Inform call and remains fixed over the lifetime of the device, including across firmware updates. Any change indicates that the device is a new device and a BOOTSTRAP Inform is to be performed.

Software Version is a string identifying the version of the overall CPE firmware as defined in TR-181. FirmwareImage. Version is the target firmware version to update.

FIGS. 3A-B show a data model 300 according to at least one embodiment.

The firmware update data model parameters are based on TR-181 Device:2 Data Model definitions as shown in Table 1. An instance of this Firmware Update Model follows the lifecycle of Device:2 Data Model itself, and follows the state diagram.

TABLE 1

| Firmware Update Data Model Overview | | |
|---|---|---|
| Name | Type | Description |
| Device.DeviceInfo | object | ProductClass, Manufacturer, OUI, SerialNumber |
| Device.Cellular.Interface.{i}. | object | A cellular modem including IMEI, and USIM |
| Device.DeviceInfo.FirmwareImage.{i}. | object | Top-level object for mapping firmware images, helping ACS capture the device firmware, push firmware update decision. |

There may be one or more Firmware Image Interface Objects in one TR-069 session. Firmware images are mapped in the top-level object, Device.DeviceInfo.FirmwareImage.{i}. The following are the children Interface Objects of the Firmware Update Data Model based on TR-181.

The parameter Device.DeviceInfo.DeviceCategory (Optional) 312 has a description 352 of being a comma-separated list of strings. Each list item is a device category (e.g. "Router", "Recorder" and "Tracker").

The parameter Device.DeviceInfo.ProductClass 314 has a description 355 of being an identifier of the class of product for which the serial number applies. The product class identifier is used in Inform calls from CPE, and remains fixed over the lifetime of the device, including across firmware updates. Any change indicates that the device is a new device and a BOOTSTRAP Inform is to be performed. BOOTSTRAP inform is sent by CPE to ACS to inform the ACS of the identify, and communication information for the ACS to communicate with the CPE.

The parameter Device.DeviceInfo.Manufacturer 316 has a description 356 of being an identifier of the manufacturer of the CPE. This parameter is used in Inform calls from CPE to share manufacturer information with the ACS.

The parameter Device.DeviceInfo.ManufacturerOUI 318 has a description 358 of being an Organizationally Unique Identifier (OUI) of the device manufacturer and is represented as a six hexadecimal-digit value using upper-case letters and including any leading zeros. The OUI value is used in Inform calls and remains fixed over the lifetime of the device, including across firmware updates. Any change indicates that the device is a new device and a BOOTSTRAP Inform is to be performed.

The parameter Device.DeviceInfo.SerialNumber 320 has a description 360 of being an identifier of the particular device that is unique for the indicated class of product and manufacturer. The serial number is used in Inform calls from the CPE. and remains fixed over the lifetime of the device, including across firmware updates. Any change indicates that the device is a new device and a BOOTSTRAP Inform is to be performed.

The parameter Device.DeviceInfo.SoftwareVersion (Optional) 322 has a description 362 of being a string that identifies the version of the overall CPE firmware.

The parameter Device.Cellular.Interface.{i}.IMEI 324 has a description 364 of being the International Mobile Equipment Identity (IMEI) number that is represented as a 15 digit string (digits 0-9).

The parameter: Device.Cellular.Interface.{i}.USIM.IMSI (Optional) 326 has a description 366 of being the Universal Subscriber Identity Module (USIM) International Mobile Subscriber Identity (IMSI) as represented as a string with either 14 or 15 digits.

The parameter Device.Cellular.Interface.{i}.USIM.ICCID (Optional) 328 has a description 368 of being the USIM Integrated Circuit Card Identifier (ICCID) that is represented as a string of up to 20 digits.

The parameter Device.Cellular.Interface.{i}.USIM.MSISDN (Optional) 330 has a description 370 of being the USIM Mobile Subscriber Integrated Service Digital Network (MSISDN) Number.

FIG. 3B continues the description of the data model according to at least one embodiment.

The parameter Device.DeviceInfo.FirmwareImage.{i}.Alias (Optional) 332 has a description 372 of being a non-volatile unique key used to reference the instance of the firmware image. Alias provides a mechanism for a controller to label this instance of the firmware image for future reference. Alias is not to be empty, and starts with a letter. In response to the value of Alias not being assigned by the controller at creation time, an agent assigns a value with an "CPE-" prefix. The value of Alias does not change once the value has been assigned.

The parameter Device.DeviceInfo.FirmwareImage.{i}.Name (Optional) 334 has a description 374 of being the firmware image name. This firmware image name is a descriptive text of the image or filename.

The parameter Device.DeviceInfo.FirmwareImage.{i}.Version 336 has a description 376 of being is a string that identifies the version of the firmware image. In response to the firmware image version being active (i.e., the device has booted this firmware image), the value of the DeviceInfo.Software Version parameter is to be the same as the value contained in this parameter.

The parameter Device.DeviceInfo.FirmwareImage.{i}.Available 338 has a description 378 of specifying whether or not this particular firmware image is being used by the device. A device attempts to boot this particular firmware image in response to the value being set to true. The value is set to true in response to a new firmware image being installed. In response to the firmware image being active or being referenced by the BootFirmwareImage parameter, the value is not to be set to false.

The parameter Device.DeviceInfo.FirmwareImage.{i}.Status 340 has a description 380 of defining the following status of a firmware image that can be determined by an agent. The agent is implemented in the device and manages firmware image processing, validation and installation towards final reboot.

NoImage 384 indicates that the firmware image instance is empty. NoImage is used for an agent that supports multiple firmware images, but has an image installed. Downloading 386 indicates that the firmware image instance is being downloaded. Validating 388 indicates that the firmware image instance has been downloaded, and is in the process of being validated. Available 390 indicates that the firmware image instance has been downloaded, validated, and installed, and is ready to be activated. DownloadFailed 392 indicates that the agent has attempted to download the firmware image instance, but ultimately failed while retrieving the firmware image instance from the source URL. ValidationFailed 394 indicates that the agent has attempted to validate the downloaded firmware image instance, but ultimately failed while being validated. InstallationFailed 396 indicates the agent attempted to install the firmware image downloaded and validated to this instance, but ultimately failed while being installed. ActivationFailed 398 indicates that the agent has attempted to activate the firmware image instance, e but failed while being activated.

Figure 4:
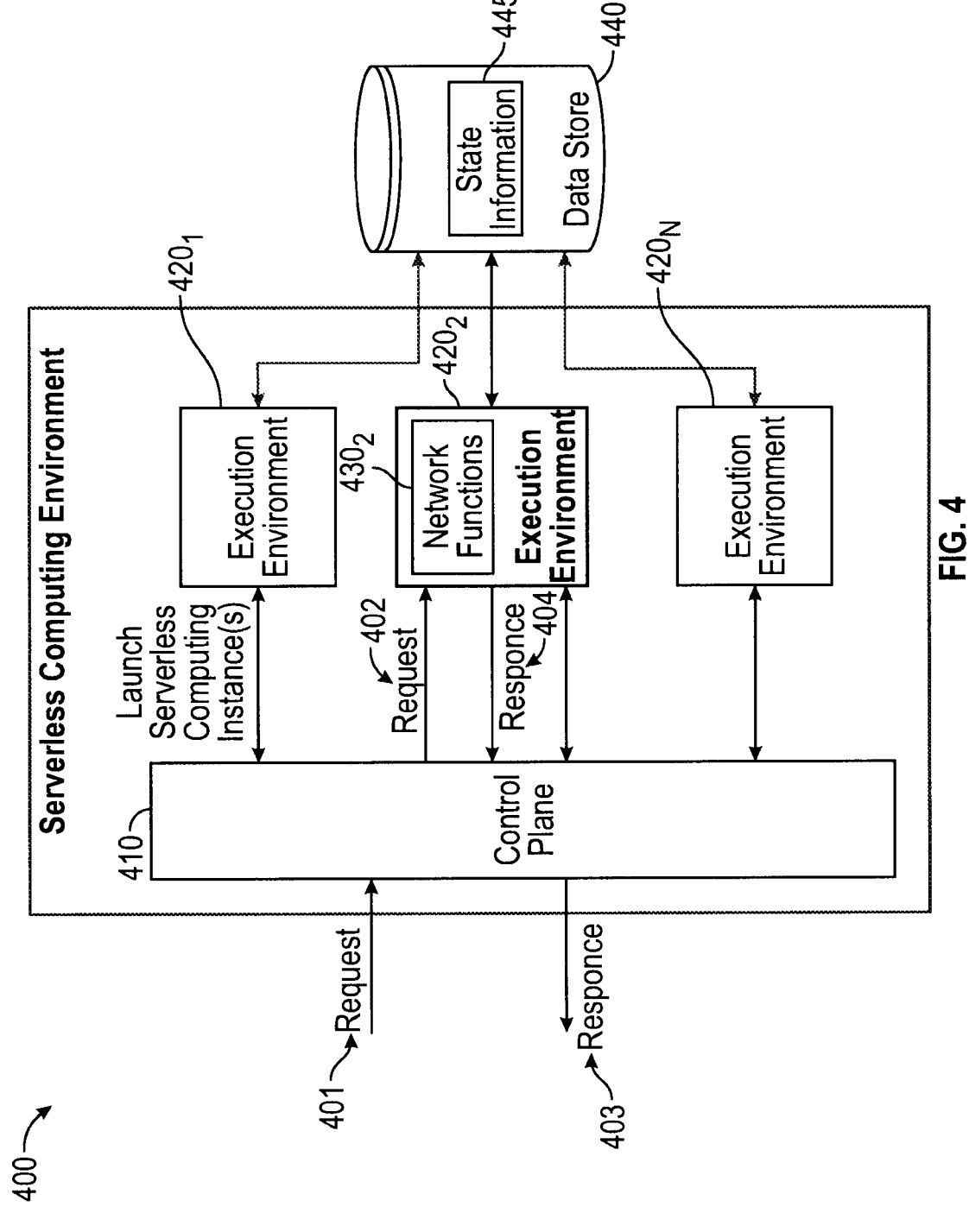
FIG. 4 illustrates a block diagram of a serverless computing environment according to at least one embodiment.

FIG. 4 illustrates a block diagram of a serverless computing environment 400 according to at least one embodiment.

Serverless computing environment 400 is also sometimes referred to as "Functions-as-a-Service (FaaS)," which provides computing in short-lived, stateless, small chunks with highly flexible scaling. In contrast to (Virtual Machines (VMs) and physical servers, users of serverless computing services do not provision/manage VMs or physical servers, and instead build applications as a set of functions that run in the serverless computing environment. Resource provisioning and scaling are then handled by, e.g., a cloud provider of the serverless computing environment.

Serverless computing environment 400 is used to provide FOTA services according to at least one embodiment. Device manufacturers do not contribute independent development for the Serverless computing environment 400. Network Function 4301-$n$ are configured with parameters designed for providing FOTA services as described herein.

Serverless computing environment 400 includes a control plane 410 (also referred to as a "serverless computing platform") in communication with multiple execution environments 420$_1$ to 420$_N$. Execution environments 420$_1$ to 420$_N$ are Virtual Machines (VMs), lightweight containers, containers running in VMs, or any other suitable virtual computing instance or physical system in which functions can run. As described, serverless computing environment 400 permits users to package their applications as stateless functions that are housed in small short-lived compute units (e.g., containers) and dynamically scale functions based on user-provided events. Control plane 410 receives and filters requests from users. For example, a request is able to be received to trigger a firmware upgrade. In response to receiving the request, control plane 410 launches an appropriate serverless computing instance in one of execution environments 420$_1$ to 420$_N$. The serverless computing instance may be launched in a container that is already running or, if no compatible container is running, a container may also be launched that runs the serverless computing instance. Although described herein with respect to launching serverless computing instance(s), those skilled in the art understand that the serverless computing environment 400 re-uses serverless computing instance(s) rather than launching new serverless computing instance(s) in response to the serverless computing instance(s) already running. That is, "launching" as used herein may refer to the launch of a new serverless computing instance or re-use of an already running serverless computing instance(s), as appropriate.

In response to receiving a request 401 from a client device, control plane 410 of serverless computing environment 400 launches (or re-uses) serverless computing instance(s) 402 to execute the requested network function(s) (e.g., network function 430*i*) in the appropriate execution environment(s) 420₁ to 420_N_. Although the executing of network functions as serverless computing instances is described herein for ease of understanding, in some embodiments, network functions 430*i* are decomposed into sub-functions/micro-services that run as serverless computing instances. That is, a serverless computing instance runs a network function or a sub-function/module of network function 430*i*, and "network function" as used herein refers to either a network functions or a network sub-function/module. In response to state information being used for processing of the request by any of the network function(s), then a serverless computing instance first queries data store 440 for the state information 445 and then use such information in processing the request. The launched (or re-used existing) serverless computing instance(s) then processes the request and sends a response 404 to control plane 410. Control plane 410 forwards response 403 to the requesting client device.

Figure 5:
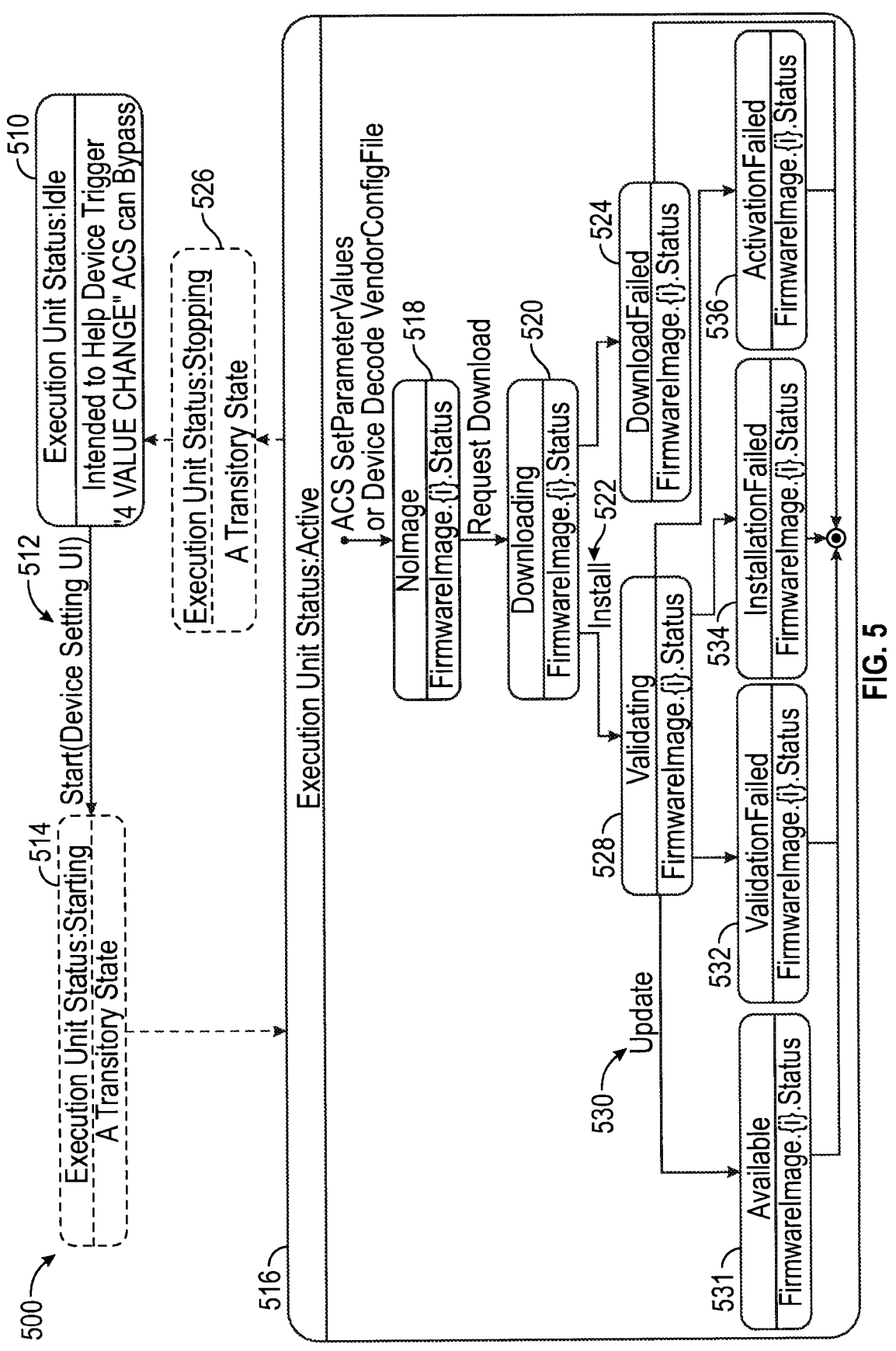
FIG. 5 illustrates the firmware update state diagram according to at least one embodiment.

FIG. 5 illustrates the firmware update state diagram 500 according to at least one embodiment.

While the device is starting a Firmware Update, the device obtains the latest firmware image information from ACS as illustrated above with regard to FIG. 1. TR-069 defines a Customer Premise Equipment (CPE)_Wireless Access Network (WAN) management protocol (CWMP) used between an auto-configuration server (ACS) and CPE. TR-181 defines the device data model for TR-069 devices. The target firmware image appear in the device's Device.DeviceInfo.FirmwareImage.{i} interface objects as described below. Thus, the target firmware image being upgraded starts from the state of "NoImage" and terminate at one of the status of Available, DownloadFailed, ValidationFailed, InstallationFailed, ActivationFailed.

The Execution Unit Status begins in the idle state 510. Idle state 510 is intended to help device trigger "4 VALUE CHANGE." Because the operations on Device Setting UI is not defined in TR-181, interface objects, the device is able to represent the state transitions through an Execution Unit as defined in TR-069. The ACS is able to bypass this value change.

In the Device Setting User Interface (UI), the firmware update is started 512. The Execution Unit Status transitions to the Starting state 514. As shown in FIG. 5, the Starting state 514 is a transitory state. The Execution Unit State moves to Active state 516.

ACS Set Parameter Values are provided to No Image state 518. The download is requested 520. In response to the Firmware Image status being success the firmware is installed 522.

In response to the Firmware Image status failing 524, the state diagram returns to the Execution Unit Status: Stopping 526. As shown in FIG. 5, the Execution Unit Status: Stopping 526 state is a transitory state. In installing the firmware update 522, the firmware image is validated 528.

The firmware image upgrade is updated 530 and Available 531. The state diagram then returns to the Execution Unit Status: Stopping 526. Alternatively, the firmware image validation fails 532, the firmware image installation fails 534, or the firmware image activation fails 536. In response to the firmware image validation failing 532, the firmware image installing failing 534, or the firmware image activation failing 536, the state diagram returns to the Execution Unit Status: Stopping 526.

States shown in firmware update state diagram 500 are sent to the ACS. The ACS is able to capture and process all states. The ACS is able to achieve FOTA according to at least one embodiment described herein in response to the Device Setting UI ignoring the status. However, the status change in FirmwareImage cannot be bypassed.

Figure 6:
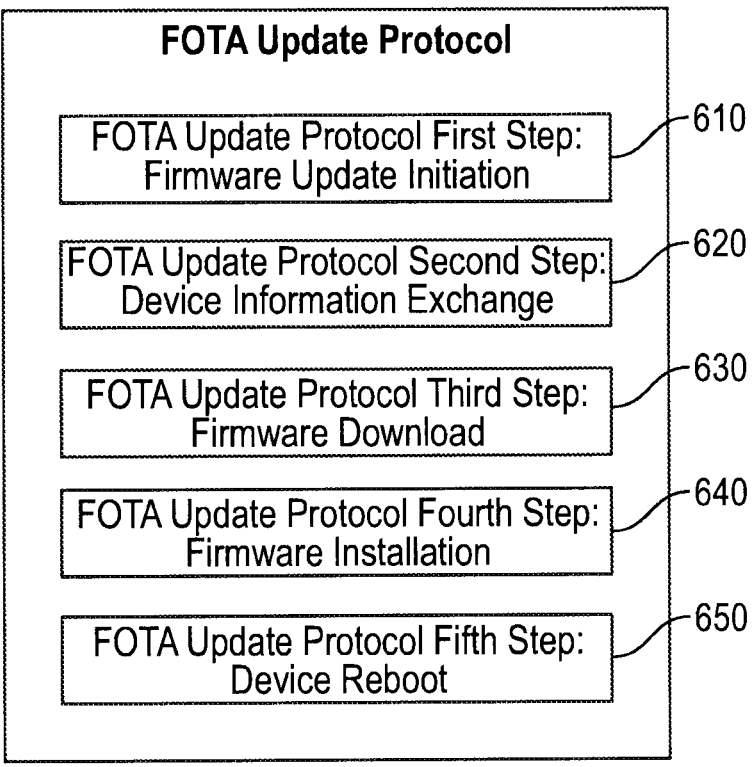
FIG. 6 illustrates an overview of the FOTA Update Protocol according to at least one embodiment.

FIG. 6 illustrates an overview of the FOTA Update Protocol 600 according to at least one embodiment.

In FIG. 6, FOTA Update Protocol 600 specifies a set of procedures with associated parameters and management objects that are used for FOTA updates. The procedures of FOTA Update Protocol 600 also enable implementation of the Device Setting UI that allows different triggers for initializing the firmware update and for logging status history of firmware images in the devices.

The FOTA Update Protocol First Step 610 involves the firmware update initiation. The FOTA Update Protocol Second Step 620 involves the device information exchange. The FOTA Update Protocol Third Step 630 involves the firmware download. The FOTA Update Protocol Fourth Step 640 involves the firmware installation. The FOTA Update Protocol Fifth Step 650 involves the device reboot to update the firmware used by the device. Steps 610-650 are described in greater detail with respect to FIGS. 7-11.

CPE WAN Management Protocol (CWMP) is a communication protocol used between an ACS and CPE that defines a mechanism for secure auto-configuration of a CPE and other CPE management functions in a common framework. The procedures of FOTA Update Protocol 600 extend CWMP to allow for an implementation of the procedures of the FOTA Update Protocol. The procedures of FOTA Update Protocol 600 are implemented according to a data model that conforms to TR-181 and its behavior to support updating firmware in mobile devices according to TR-069. The procedures of FOTA Update Protocol 600 leverages CWMP based on TR-069 and Device:2 Data Model based on TR-181. This represents the interface between the CPE device and ACS used to manage the update of the firmware of a mobile device. The content and format of the update package, and the process used to update firmware in the device are implementation specific and are not limited by embodiments described herein.

The procedures of FOTA Update Protocol 600 extends the use of multiple firmware images of TR-069. Devices are able to support multiple firmware images, wherein multiple firmware images are able to be installed on the CPE at the same time. Installation of multiple firmware images improves the robustness and stability of a device. In response to a device not being able to boot a newly installed firmware image, the device has the ability to attempt to boot from a different firmware image.

Being able to support multiple firmware images offers the service provider the ability to download a firmware image without activating the firmware image. Then, the service provider is able to cause the device to switch to the downloaded, but inactivated firmware image, by sending a call to SetParameterValues and the device rebooting at some later time. This spreads the download portion of a firmware upgrade over a longer period of time to minimize the impact of the upgrade on the provider's network. In operation, the device downloads the firmware image and installs the firmware into a non-active firmware image location.

Once a device has multiple firmware images installed and available for activation, an ACS uses the data model to query what images are on the device, which image is active, and configure which image the device is to activate the next time the device reboots. Another benefit of having multiple firmware images on a device is that in response to a device not being able to boot into a target firmware image because of some problem with the image, the device is able to boot one of the other firmware images. The ACS keeps track of the value of "Device.DeviceInfo.SoftwareVersion" parameter so that the device is able to boot the appropriate firmware image.

Figure 7:
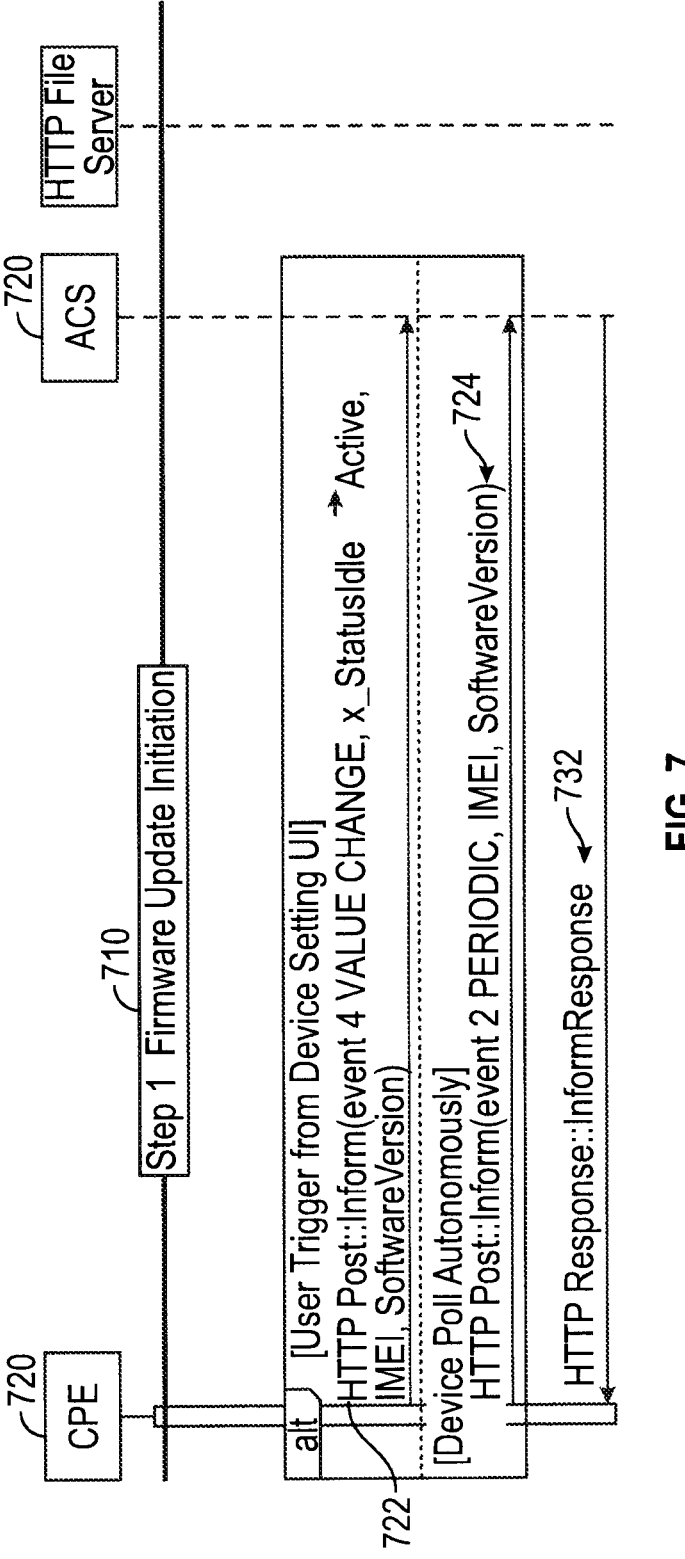
FIG. 7 illustrates the firmware update initiation method according to at least one embodiment.

FIG. 7 illustrates the firmware update initiation method 700 according to at least one embodiment.

In order to begin a firmware update, the device opens a data connection to the ACS. The firmware update process is able to be initiated through use of a trigger from a device setting UI, by an autonomous device poll, through menu items, and use of service codes on the device. The user-triggered update process launches a TR-069 session. In FIG. 7, firmware update initiation 710 is triggered through the Device Setting UI 722 by the CPE 720 sending an HTTP post request including a TR-069 inform message encoded as Simple Object Access Protocol (SOAP) 724 to the ACS 730. HTTP messages are used to exchange data between the ACS 730 and the CPE 720. In order to begin a firmware update, CPE 720 opens a data connection to the ACS 730. The firmware update process is able to be initiated through use of a trigger from a device setting UI, by an autonomous device poll, through menu items, and use of service codes on the device. The user-triggered update process launches a TR-069 session.

In FIG. 7, HTTP post request including a TR-069 inform message encoded as SOAP 722 includes event 4 Value Change,X_StatusIdle Active to inform the ACS of a change in status from idle to active. The HTTP post request including a TR-069 inform message encoded as SOAP 722 also includes the IMEI value and the Software Version.

Alternatively, the firmware update initiation 710 is able to be triggered through autonomous device poll 724 by the CPE 720 sending to the ACS 730 an HTTP post request including a TR-069 inform message encoded as SOAP 724 with event 2 Periodic, which indicates the message is sent autonomously after the CPE periodic inform interval expired. HTTP post request including a TR-069 inform message encoded as SOAP 724 also includes the IMEI value and the Software Version.

ACS 730 sends CPE 720 a TR-069 InformResponse 732, in response to the previous HTTP request of TR-069 inform message 724, which includes no arguments.

Figure 8:
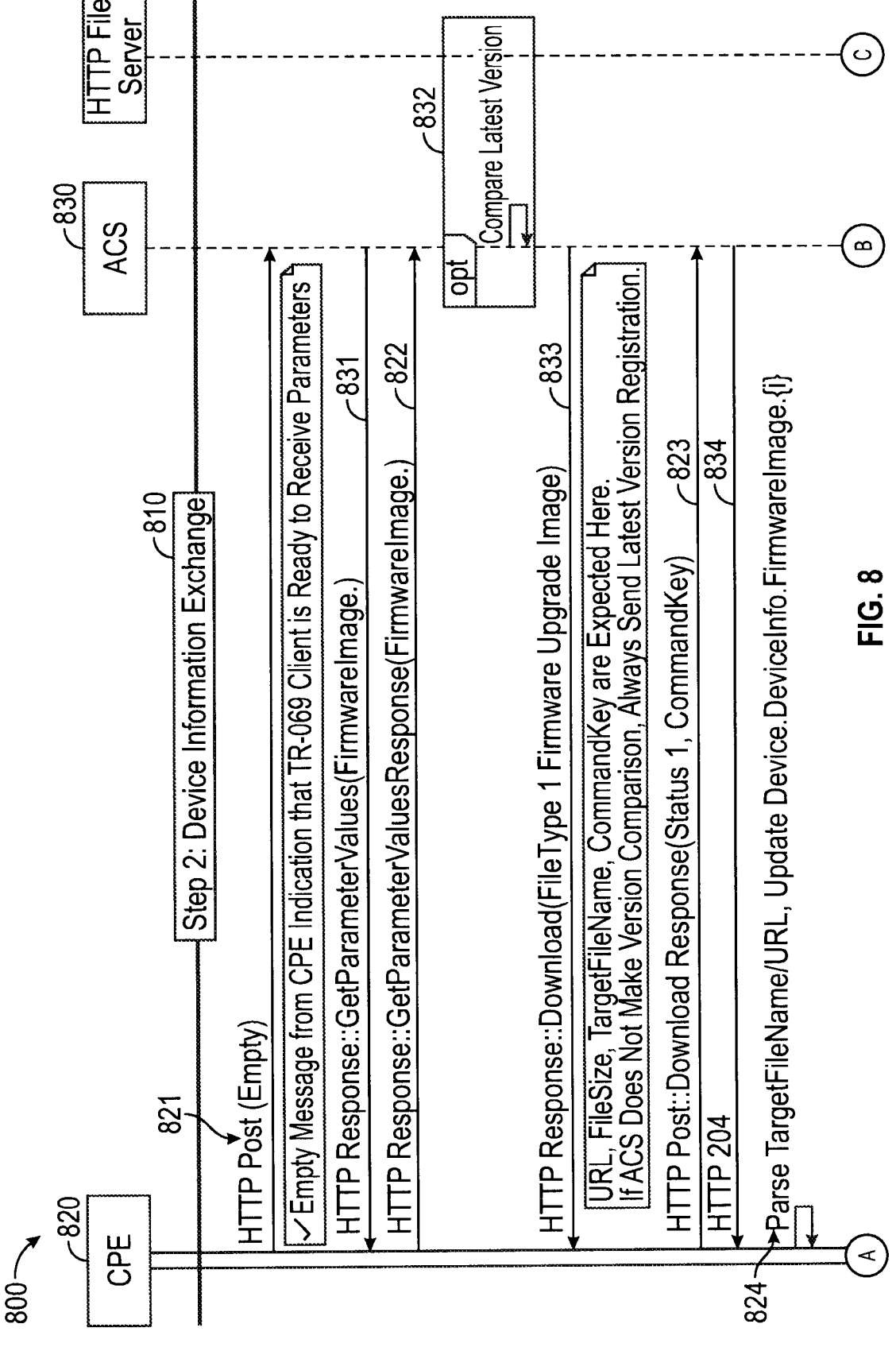
FIG. 8 illustrates the device information exchange method according to at least one embodiment.
Figure 8:
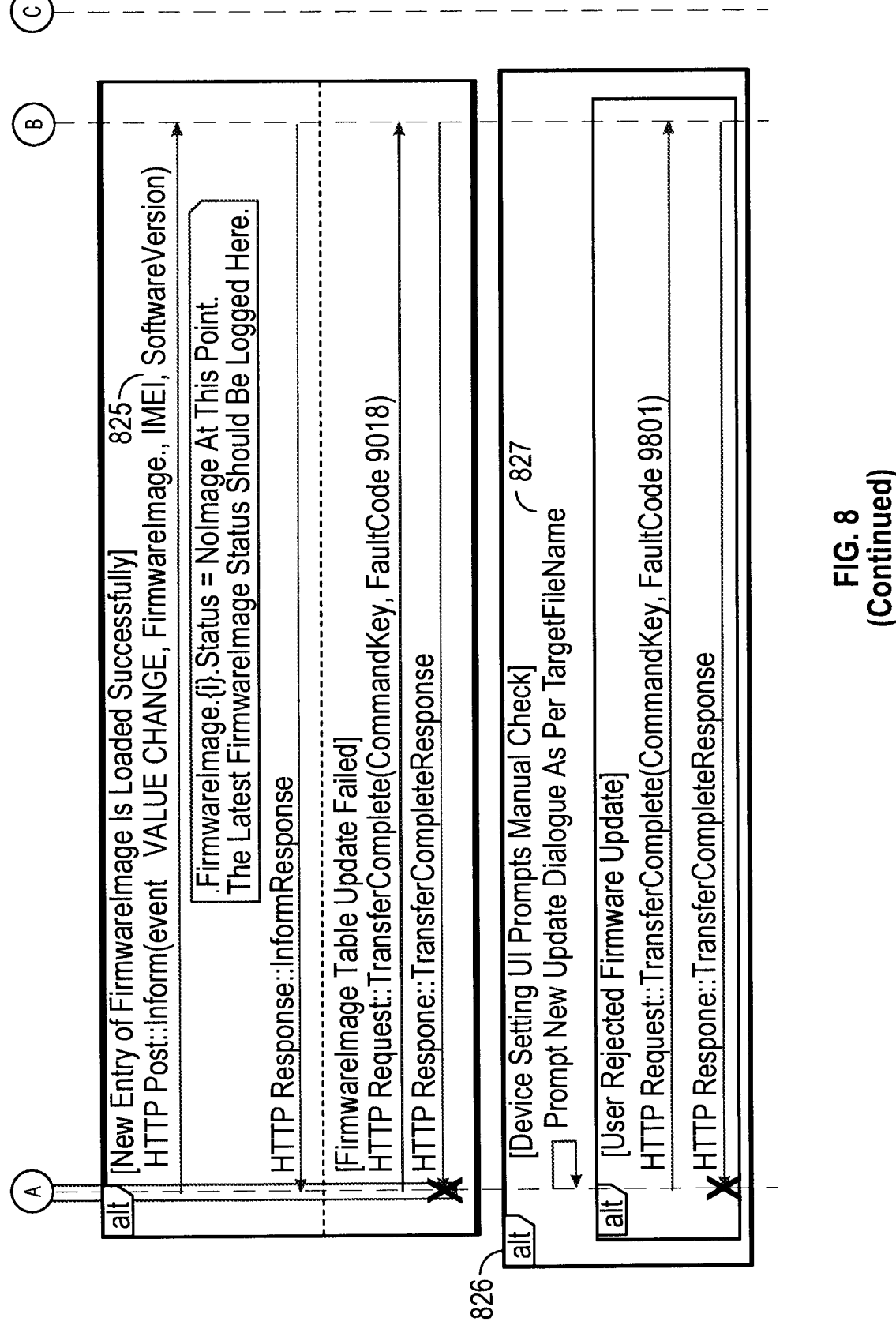

FIG. 8 illustrates the device information exchange method 800 according to at least one embodiment.

In FIG. 8, Device Information Exchange 810 begins with CPE 820 sending ACS 830 an HTTP post request 822 that is empty. The empty request for CPE 822 indicates that the TR-069 client (i.e., CPE 820) is ready to receive parameters.

In order to provide CPE 820 with the appropriate firmware update, a minimum set of selection criteria is synchronized from CPE 820 to ACS 830, for each FOTA Session. The minimum set of criteria includes Device.Cellular.Interface.{i}.IMEI identifying the IMEI of CPE 820, Device.DeviceInfo.Software Version identifying the version of the firmware used by CPE 820, and Device.DeviceInfo.FirmwareImage.{i} that identifies the target firmware version to update.

In FIG. 8, CPE 820 sends HTTP post request with empty payload 821 to ACS 830. HTTP post request with empty payload 821 indicates that TR-069 CPE 820 is ready to receive parameters. HTTP response::GetParameterValues (FirmwareImage.) 831 is used by ACS 830 to obtain the value of one or more CPE Parameters, e.g., FirmwareImage.

HTTP post::GetParmeterValesResponse (FirmwareImage.) 822 is sent by CPE 820 to provide ACS the queried parameters, i.e., FirmwareImage. The ACS 830 optionally compares the latest version 832 to the firmware image identified by CPE 820. ACS 830 returns a TR-069 Download request in an HTTP response 833 to synchronize the information defined as FileType 1 Firmware Upgrade Image in TR-069 with CPE 820. URL, FileSize, TargetFileName, CommandKey are expected parameters from ACS 830. Optionally, ACS 830 is able to decide whether to implement version comparison.

CPE 820 returns a TR-069 DownloadResponse 823, with the parameters of Status value 1 and CommandKey, in an HTTP request to tell ACS 830 that the queried device information synchronization has been completed. The ACS 830 returns an empty HTTP response 834 to the CPE 820 indicating the completion of synchronizing device information with the ACS 830. CPE 820 parses TargetFileName or the URL 824 from the Download Request 833 from the ACS 830 and updates the information into the Device.DeviceInfo.FirmwareImage parameters inside CPE 810 (e.g., TR-069 agent).{i} 824.

CPE 820 sends ACS 830 HTTP request including TR-069 Inform 825 with the 4 Value Change event and parameters of FirmwareImage, IMEI, ad SoftwareVersion, where the FirmwareImage.{i}.Status is NoImage at this time. The latest FirmwareImage Status is logged here. ACS 830 response to CPE 820 with HTTP response::Inform Response 834.

Alternatively the Device Setting UI of CPE 820 prompts a manual check 826, where a new update dialogue is prompted per TargetFileName 827.

Figure 9:
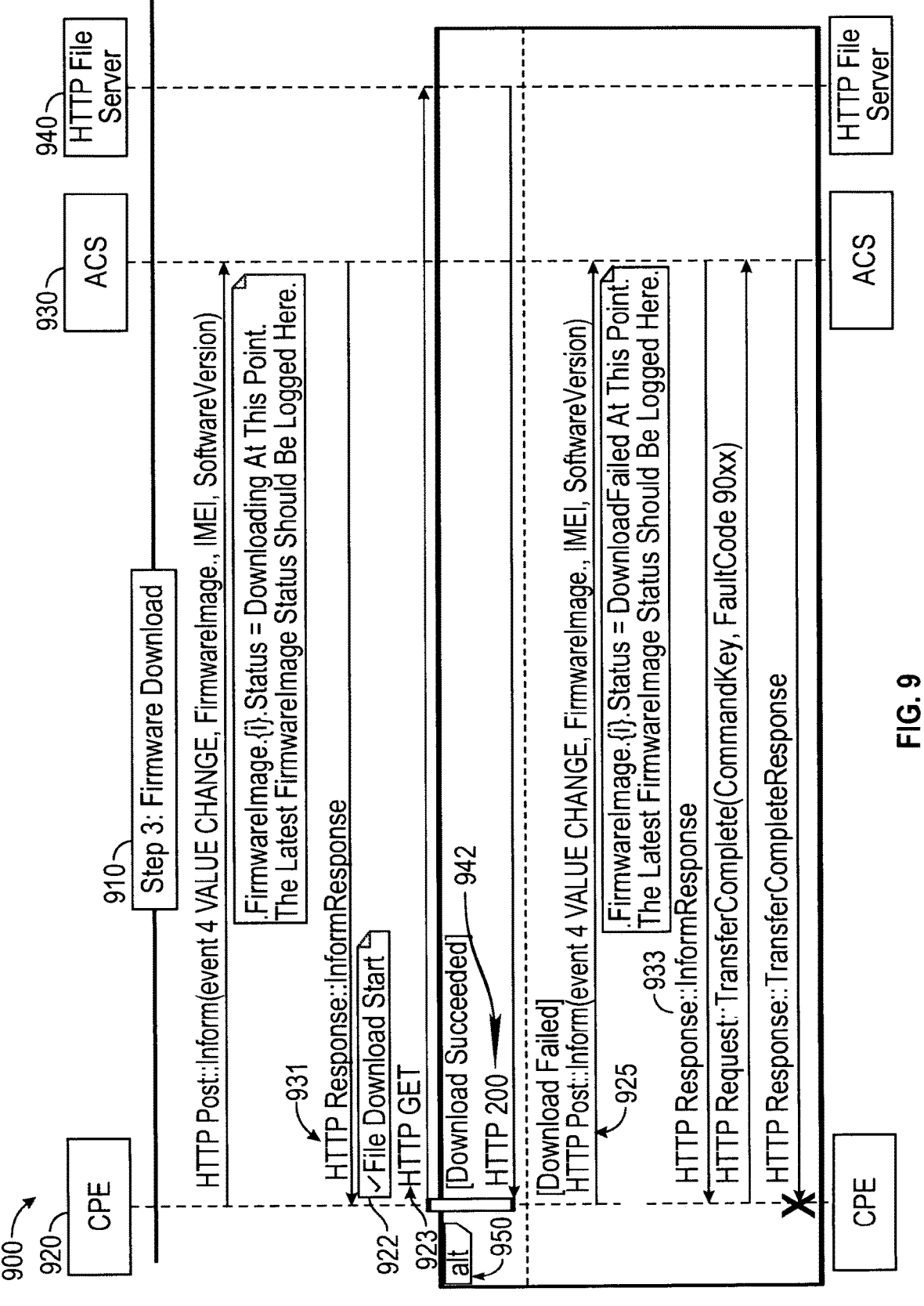
FIG. 9 illustrates a firmware download method according to at least one embodiment.

FIG. 9 illustrates a firmware download method 900 according to at least one embodiment.

In FIG. 9, firmware download 910 begins by the CPE 920 sending the ACS 930 HTTP post request including a TR-069 Inform with a TR-069 event of 4 VALUE CHANGE, and parameters of FirmwareImage., IMEI, and Software Version 921 to inform ACS 930 that CPE 920 is ready for FirmwareImage.{i}.Status downloading. ACS 930 logs the downloaded firmware as the latest firmware status. ACS 930 returns to CPE 920 an HTTP response including a TR-069 InformResponse 931 to inform CPE 920 to begin downloading the firmware image. CPE 920 starts downloading the firmware image 922.

CPE 920 sends HTTP File Server 940 a HTTP GET message 923 to obtain the firmware image based on a URL associated with the firmware image instructed by ACS 930. HTTP File Server 940 provides the firmware image as an arbitrary binary data stream, e.g., octet-stream, within an HTTP 200 OK response 942.

CPE 920 sends an HTTP request including a TR-069 Inform 924 with the TR-069 event 1 Boot, and parameters of FirmwareImage., IMEI, and Software Version to ACS 930, where the FirmwareImage.{i}.Status is valued Available, indicating CPE 910 is ready to boot to activate the target firmware image. ACS 930 logs Available as the latest FirmwareImage Status.

In response to the download failing 950, CPE 920 sends HTTP post request including a TR-069 Inform 925 with the TR-069 event 4 VALUE CHANGE, and parameters of FirmwareImage., IMEI, and SoftwareVersionto informs ACS 930 of the failure. FirmwareImage.{i}.Status=DownloadFailed at this point. ACS 930 logs DownloadFailed as the latest FirmwareImage Status. ACS returns an HTTP response including a TR-069 InformResponse 933 to CPE 920 to acknowledge the failure of the download of the firmware image.

Figure 10:
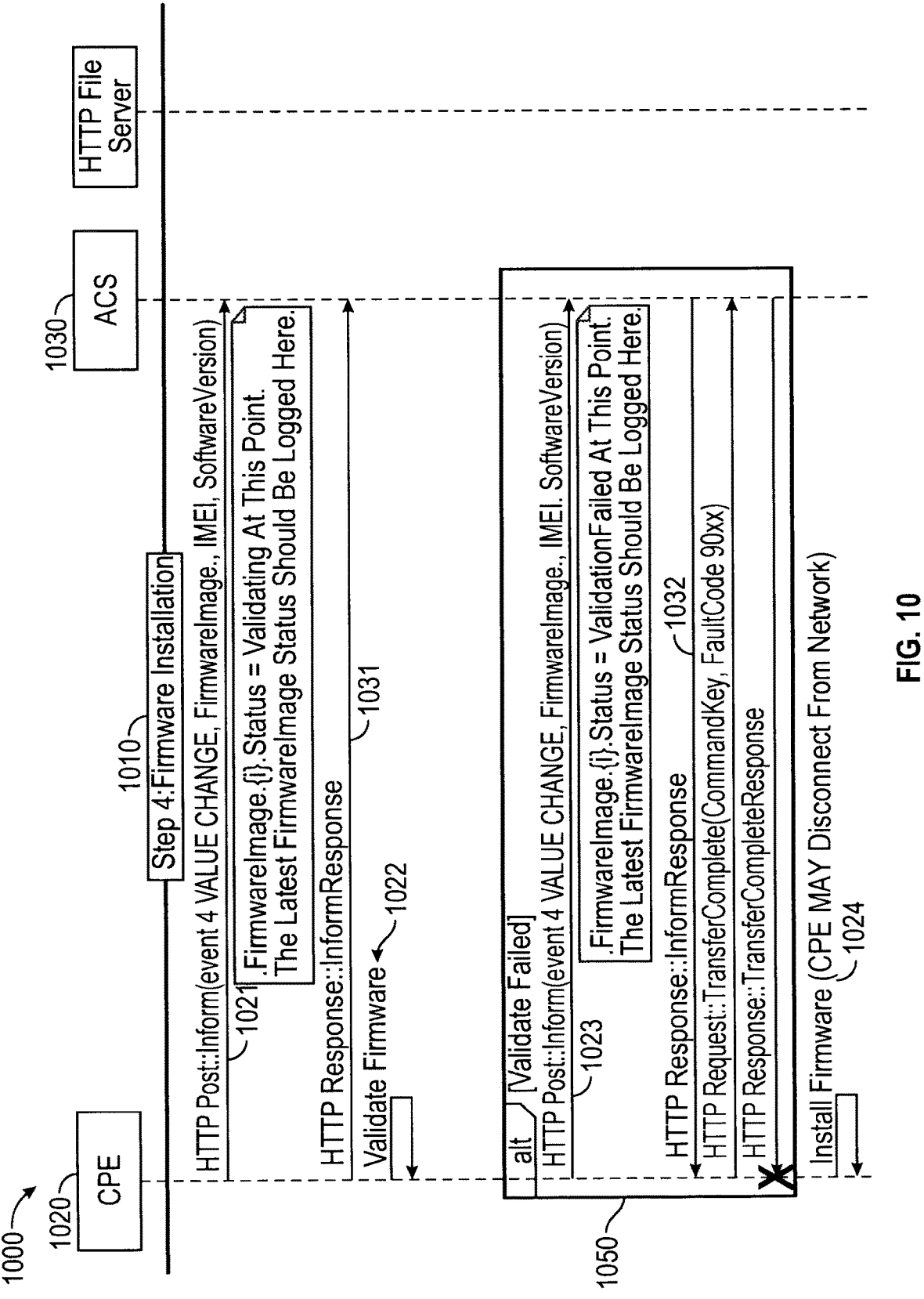
FIG. 10 illustrates the firmware installation method according to at least one embodiment.

FIG. 10 illustrates the firmware installation method 1000 according to at least one embodiment.

In FIG. 10, Firmware Installation 1010 begins with CPE 1020 sending an HTTP post request including a TR-069 Inform 1021 with the TR-069 event 4 VALUE CHANGE, and parameters of FirmwareImage., IMEI, and Software-Version to inform ACS 1030 that CPE 1020 is beginning to install the firmware image. FirmwareImage.{i}.Status=Validating at this point and the latest FirmwareImage Status is logged by ACS 1030. ACS 1030 returns an HTTP response including a TR-069 Inform-Response 1031 to CPE 1020 to acknowledge the CPE is beginning to install the firmware image. CPE 1020 validates the firmware image 1022.

In response to failure of the validation of the firmware image 1050, CPE 1020 sends an HTTP post request including a TR-069 Inform 1023 with the TR-069 event 4 VALUE CHANGE, and parameters of FirmwareImage., IMEI, and SoftwareVersion to ACS 1030 to inform ACS 1030 that the validation of the firmware image failed. FirmwareImage.{i}.Status=ValidationFailed at this point and the latest FirmwareImage Status is logged by ACS 1030. ACS 1030 returns an HTTP response including a TR-069 InformResponse 1032 to CPE 1020 to acknowledge to CPE 1020 that ACS 1030 has logged the failure.

In response to successful validation of the firmware image, the firmware image is installed 1024.

Figure 11:
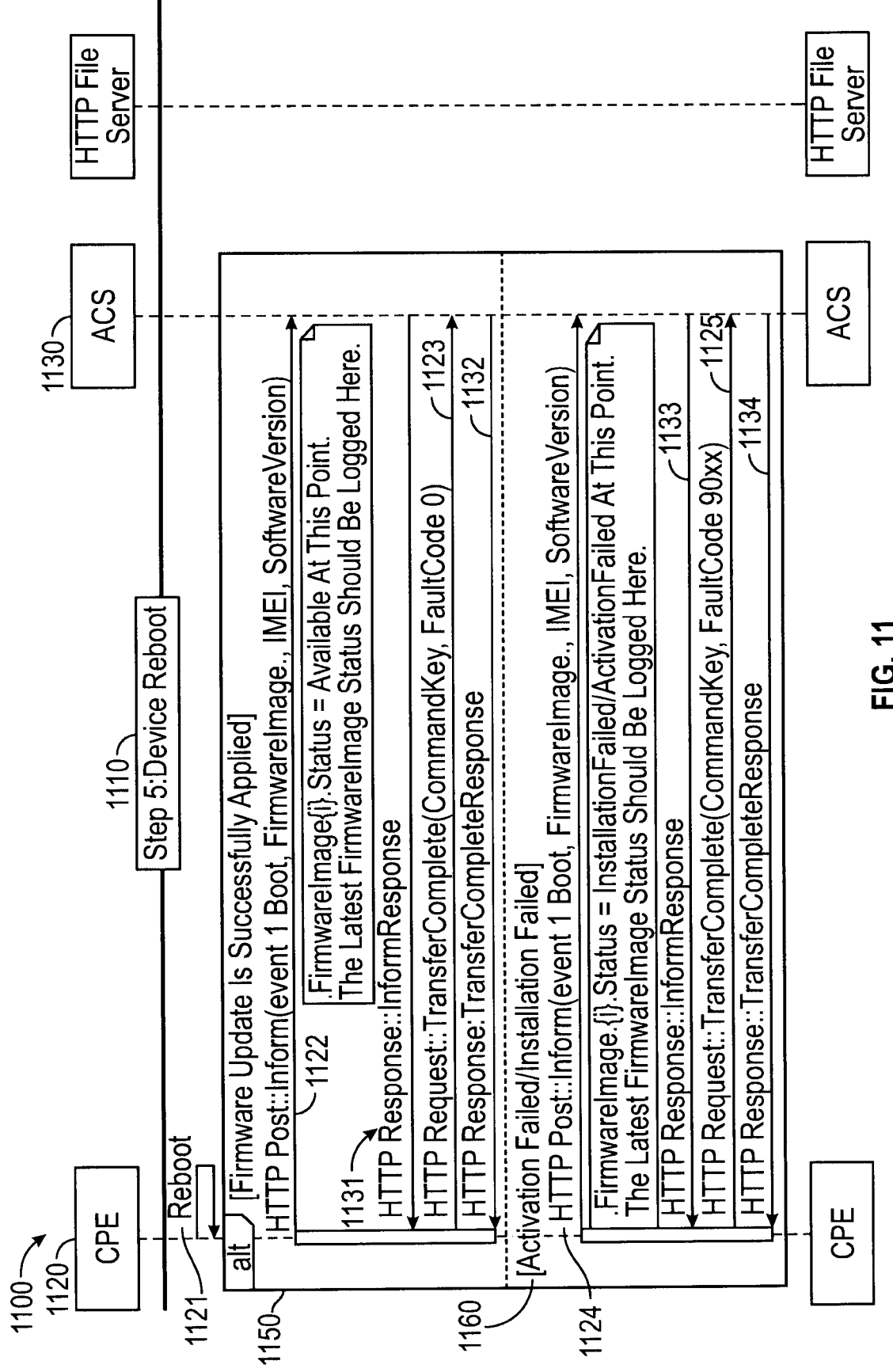
FIG. 11 illustrates the device reboot method according to at least one embodiment.

FIG. 11 illustrates the device reboot method 1100 according to at least one embodiment.

In FIG. 11, Device Reboot 1110 begins with CPE 1120 performing a Reboot 1121. In response to successful application of the firmware image 1150, CPE 1120 sends an HTTP request including a TR-069 Inform 1122 with the TR-069 event 1 Boot, and parameters of FirmwareImage., IMEI, and SoftwareVersion to ACS 1130 to inform ACS 1130 that the firmware image was successfully applied. The FirmwareImage.{i}.Status=Available at this point and the latest FirmwareImage Status is logged by ACS 1130. ACS 1130 returns an HTTP response including a TR-069 Inform-Response 1131 to CPE 1120 to acknowledge that the firmware image was successfully applied by CPE 1120. CPE 1120 sends an HTTP post request including a TR-069 TransferComplete 1123 with parameters of CommandKey, and Zero Faultcode inside a FaultStruct to ACS 1130 to inform ACS 1130 the firmware upgrade has completed. ACS 1130 returns HTTP response including a TR-069 Transfer-CompleteResponse 1132 to CPE 1120 to acknowledge the firmware upgrade completion to CPE 1120.

In response to failure of activation or installation of the firmware image 1160, CPE 1120 sends an HTTP post request including a TR-069 Inform 1124 with the TR-069 event 1 Boot, and parameters of FirmwareImage., IMEI, and Software Version to ACS 1130 to inform ACS 1130 of the failure of the activation or installation of the firmware image. The FirmwareImage.{i}.Status=InstallationFailed/ ActivationFailed at this point. The latest FirmwareImage Status is logged by ACS 1130.

ACS 1130 returns an HTTP response including a TR-069 InformResponse 1133 to CPE 1120 to acknowledge the failure of the installation or activation of the firmware image. CPE 1120 sends an HTTP post request including a TR-069 TransferComplete 1125 with parameters of Com-mandKey, and 90xx FaultCode inside a FaultStruct to ACS 1130 to inform ACS 1130 that the firmware upgrade process has completed. ACS 1130 returns an HTTP response including a TR-069 TransferCompleteResponse 1134 to acknowledge to CPE 1120 that the firmware upgrade process has completed.

At least one embodiment provides a firmware update service that provides a common depository for firmware from different manufactures and system operators and that allows users and firmware providers to download firmware to upgrade mobile devices of users. In at least one embodiment, a firmware over-the-air (FOTA) service/platform is provided for a variety of end devices and uses the TR-069 protocol to enable firmware upgrades. The TR-069 protocol was not originally developed for end devices to perform under LTE network (basically 4G and 5G). The platform enables end devices to receive firmware upgrades under a WIFI environment and an LTE network. To provide this service with TR-069 gives rise to a first problem that the basic application layer is missing. According to an embodiment, an application layer is provided using a TR-069 firmware update protocol. The procedures of the FOTA Update Protocol 500 represents the interface between the CPE device and ACS to manage the update of the firmware.

Figure 12:
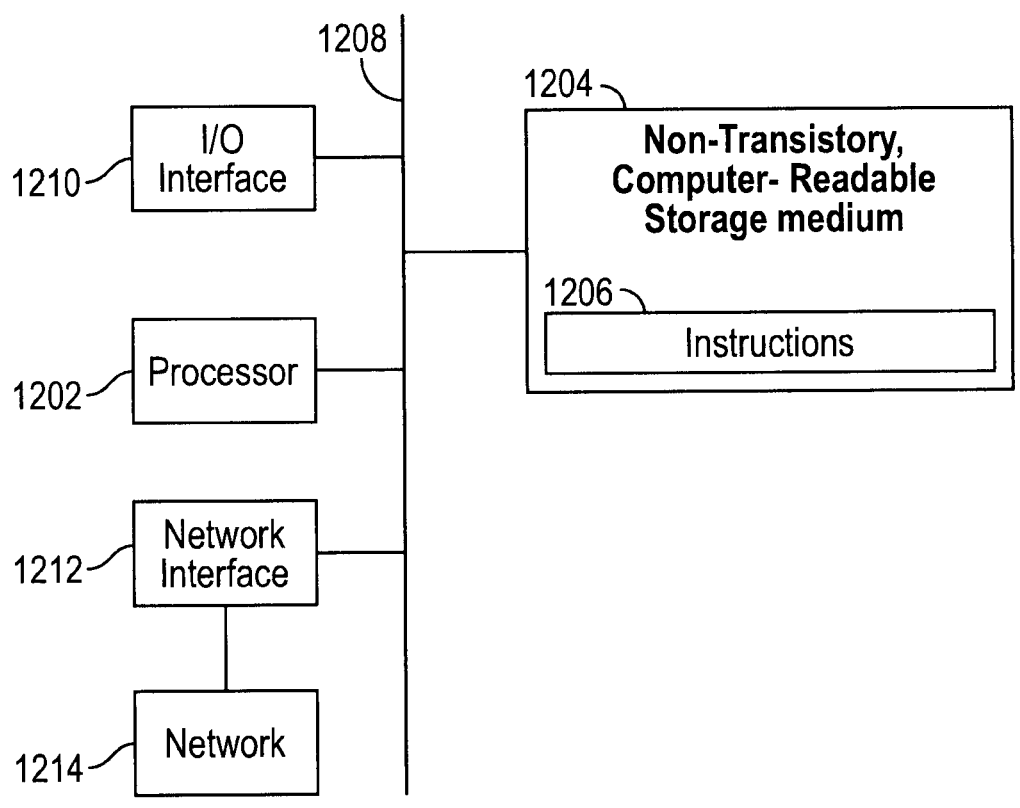
FIG. 12 is a high-level functional block diagram of a processor-based system according to at least one embodiment.

FIG. 12 is a high-level functional block diagram of a processor-based system 1200 according to at least one embodiment.

In at least one embodiment, Processing Circuitry 1200 provides a firmware over-the-air (FOTA) update to client devices. Processing Circuitry 1200 implements a firmware over-the-air (FOTA) update to client devices using Proces-sor 1202. Processing Circuitry 1200 also includes a non-transitory, Computer-Readable Storage Medium 1204 that is used to implement a firmware over-the-air (FOTA) update to client devices. Storage Medium 1204, amongst other things, is encoded with, i.e., stores, Instructions 1206, i.e., computer program code that are executed by Processor 1202 performs operations for providing a firmware over-the-air (FOTA) update to client devices. Execution of Instructions 1206 by Processor 1202 implements at least a portion of the methods described herein in accordance with one or more embodi-ments (hereinafter, the noted processes and/or methods).

Processor 1202 is electrically coupled to Computer-Read-able Storage Medium 1204 via Bus 1208. Processor 1202 is electrically coupled to an Input/output (I/O) Interface 1210 by Bus 1208. A Network Interface 1212 is also electrically connected to Processor 1202 via Bus 1208. Network Inter-face 1212 is connected to a Network 1214, so that Processor 1202 and Computer-Readable Storage Medium 1204 con-nect to external elements via Network 1214. Processor 1202 is configured to execute Instructions 1206 encoded in Com-puter-Readable Storage Medium 1204 to cause Processing Circuitry 1200 to be usable for performing at least a portion of the processes and/or methods. In one or more embodi-ments, Processor 1202 is a Central Processing Unit (CPU), a multi-processor, a distributed processing system, an Appli-cation Specific Integrated Circuit (ASIC), and/or a suitable processing unit. Processing Circuitry 1200 includes I/O Interface 1210. I/O Interface 1210 is coupled to external circuitry. In one or more embodiments, I/O Interface 1210 includes a keyboard, keypad, mouse, trackball, trackpad, touchscreen, and/or cursor direction keys for communicat-ing information and commands to Processor 1202.

Processing Circuitry 1200 also includes Network Inter-face 1212 coupled to Processor 1202. Network Interface 1212 allows Processing Circuitry 1200 to communicate with Network 1214, to which one or more other computer sys-tems are connected. Network Interface 1212 includes wire-less network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 1264.

Processing Circuitry 1200 is configured to receive information through I/O Interface 1210. The information received through I/O Interface 1210 includes one or more of instructions, data, design rules, libraries of cells, and/or other parameters for processing by Processor 1202. The information is transferred to Processor 1202 via Bus 1208. Processing Circuitry 1200 is configured to receive information from Storage Medium 1204 through I/O Interface 1210.

In one or more embodiments, one or more Non-Transitory Computer-Readable Storage Medium 1204 having stored thereon instructions (in compressed or uncompressed form) that may be used to program a computer, processor, or other electronic device) to perform processes or methods described herein. The one or more Non-Transitory Computer-Readable Storage Medium 1204 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Medium 1204 includes a Compact Disk-Read Only Memory (CD-ROM), a Compact Disk-Read/Write (CD-R/W), and/or a Digital Video Disc (DVD).

In one or more embodiments, Storage Medium 1204 stores Instructions 1206 configured to cause Processing Circuitry 1200 to perform at least a portion of the processes and/or methods for providing a firmware over-the-air (FOTA) update to client devices. In one or more embodiments, Storage Medium 1204 also stores information, such as algorithm which facilitates performing at least a portion of the processes and/or methods for providing a firmware over-the-air (FOTA) update to client devices. Accordingly, in at least one embodiment, Processor Circuitry 1200 performs a method for providing a firmware over-the-air (FOTA) update to client devices. The process providing a firmware over-the-air (FOTA) update to client devices includes provisioning an interoperable firmware over-the-air (FOTA) interface configured to use TR-069 protocol, establishing, at a server using the interoperable FOTA interface, a firmware update session with a client device, receiving, at the server, data model parameters of the client device using the TR-069 protocol, and provisioning, by the server using the TR-069 protocol, a firmware image to the client device based on the data model parameters.

The process for providing a firmware over-the-air (FOTA) update to client devices provides the advantage of simplifying FOTA server deployment. Because no external parameters are added nor specified, standard TR-069 server components are reused. The FOTA feature on devices from different vendors is able to be cross-tested/used/deployed with different FOTA services that use the same TR-069 standard.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing a firmware over-the-air (FOTA) update to a client device, comprising:
provisioning an interoperable firmware over-the-air (FOTA) interface configured to use TR-069 protocol;
establishing, at a server using the interoperable FOTA interface, a firmware update session with a client device;
receiving, at the server, data model parameters of the client device using the TR-069 protocol; and
provisioning, by the server using the TR-069 protocol, a firmware image to the client device based on the data model parameters, wherein the provisioning, by the server using the TR-069 protocol, the firmware image to the client device based on the data model parameters includes provisioning, by the server using the TR-069 protocol, multiple firmware images to the client device, and the method further comprises:
determining, by the server, information for the multiple firmware images on the client device; and
instructing the client device which of the multiple firmware images to activate in response to a next subsequent reboot of the client device.

2. The method of claim 1, further comprises providing access to the interoperable FOTA interface to at least one of:
the client device,
a carrier operator device;
a service provider device;
an infrastructure manufacturer device;
a manufacturer of the client device; or
a software vendor device.

3. The method of claim 1, wherein the provisioning the interoperable FOTA interface configured to use TR-069 protocol is initiated upon receiving a trigger from a device setting user interface (UI) of the client device, or via autonomously polling of the client device.

4. The method of claim 1, wherein the establishing, at the server using the interoperable FOTA interface, the firmware update session with the client device further includes running network functions to serve a TR-069 client device in a serverless computing environment.

5. The method of claim 1, wherein the receiving, at the server, data model parameters of the client device using the TR-069 protocol includes receiving, at the server, TR-181 data model parameters of the client device.

6. The method of claim 5, wherein the receiving, at the server, TR-181 data model parameters includes receiving at least:
an International Mobile Equipment Identity (IMSI) number associated with the client device;
an identification of a version of the firmware associated with the client device; and
an identification of the firmware image.

7. A platform for providing firmware over-the-air (FOTA) services to a client device, comprising:

a memory storing computer-readable instructions; and a processor configured to execute the computer-readable instructions to:

provision an interoperable firmware over-the-air (FOTA) interface configured to use TR-069 protocol;

establish, using the interoperable FOTA interface, a firmware update session with a client device;

receive data model parameters of the client device using the TR-069 protocol; and provision, using the TR-069 protocol, a firmware image to the client device based on the data model parameters, wherein the processor provisions, using the TR-069 protocol, the firmware image to the client device based on the data model parameters by provisioning, using the TR-069 protocol, multiple firmware images to the client device, and the processor is further configured to:

determine information for the multiple firmware images on the client device; and instruct the client device which of the multiple firmware images to activate in response to a next subsequent reboot of the client device.

8. The platform of claim 7, wherein the processor is further configured to provide access to the interoperable FOTA interface to at least one of:

the client device, a carrier operator device;

a service provider device;

an infrastructure manufacturer device;

a manufacturer of the client device; or a software vendor device.

9. The platform of claim 7, wherein the processor provisions the interoperable FOTA interface configured to use TR-069 protocol is initiated upon receiving a trigger from a device setting user interface (UI) of the client device, or via autonomously polling of the client device.

10. The platform of claim 7, wherein the processor establishes, using the interoperable FOTA interface, the firmware update session with the client device by running network functions to serve a TR-069 client device in a serverless computing environment.

11. The platform of claim 7, wherein the processor receives data model parameters of the client device using the TR-069 protocol by receiving TR-181 data model parameters of the client device.

12. The platform of claim 11, wherein the TR-181 data model parameters include at least:

an International Mobile Equipment Identity (IMSI) number associated with the client device;

an identification of a version of the firmware associated with the client device; and an identification of the firmware image.

13. A non-transitory computer-readable media having computer-readable instructions stored thereon, which when executed by a processor causes the processor to perform operations comprising:

provisioning an interoperable firmware over-the-air (FOTA) interface configured to use TR-069 protocol;

establishing, at a server using the interoperable FOTA interface, a firmware update session with a client device;

receiving, at the server, data model parameters of the client device using the TR-069 protocol; and provisioning, by the server using the TR-069 protocol, a firmware image to the client device based on the data model parameters, wherein the provisioning, by the server using the TR-069 protocol, the firmware image to the client device based on the data model parameters includes provisioning, by the server using the TR-069 protocol, multiple firmware images to the client device, and the instructions further cause the processor to perform operations comprising:

determining, by the server, information for the multiple firmware images on the client device; and instructing the client device which of the multiple firmware images to activate in response to a next subsequent reboot of the client device.

14. The non-transitory computer-readable media of claim 13, further comprises providing access to the interoperable FOTA interface to at least one of:

the client device, a carrier operator device;

a service provider device;

an infrastructure manufacturer device;

a manufacturer of the client device; or a software vendor device.

15. The non-transitory computer-readable media of claim 13, wherein the provisioning the interoperable FOTA interface configured to use TR-069 protocol is initiated upon receiving a trigger from a device setting user interface (UI) of a client device, or via autonomously polling of the client device.

16. The non-transitory computer-readable media of claim 13, wherein the establishing, at the server using the interoperable FOTA interface, the firmware update session with the client device further includes running network functions to serve a TR-069 client device in a serverless computing environment.

17. The non-transitory computer-readable media of claim 13, wherein the receiving, at the server, data model parameters of the client device using the TR-069 protocol includes receiving, at the server, TR-181 data model parameters of the client device, wherein the receiving the TR-181 data model parameters includes receiving at least:

an International Mobile Equipment Identity (IMSI) number associated with the client device;

an identification of a version of the firmware associated with the client device; and an identification of the firmware image.

* * * * *